United States Patent
Bartels et al.

(10) Patent No.: US 10,563,437 B2
(45) Date of Patent: Feb. 18, 2020

(54) FLUSH COMFORT HANDLE

(71) Applicant: Huf Hülsbeck & Fürst GmbH & Co. KG, Velbert (DE)

(72) Inventors: Markus Bartels, Mülheim (DE); Michael Rhein, Mönchengladbach (DE); Martin Porada, Wuppertal (DE); Mario Christensen, Mülheim (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 276 days.

(21) Appl. No.: 15/512,574

(22) PCT Filed: Aug. 14, 2015

(86) PCT No.: PCT/EP2015/071142
§ 371 (c)(1),
(2) Date: Mar. 20, 2017

(87) PCT Pub. No.: WO2016/041996
PCT Pub. Date: Mar. 24, 2016

(65) Prior Publication Data
US 2017/0292297 A1    Oct. 12, 2017

(30) Foreign Application Priority Data

Sep. 18, 2014  (DE) ............... 20 2014 010 524 U
Mar. 25, 2015  (DE) ................... 10 2015 104 545

(51) Int. Cl.
*E05B 77/04*    (2014.01)
*E05B 85/10*    (2014.01)
(Continued)

(52) U.S. Cl.
CPC .......... *E05B 85/107* (2013.01); *B60Q 1/2669* (2013.01); *E05B 77/04* (2013.01); *E05B 79/20* (2013.01); *E05B 81/90* (2013.01)

(58) Field of Classification Search
CPC ........ E05B 85/107; E05B 77/04; E05B 79/20; E05B 81/90; E05B 77/06; E05B 79/22;
(Continued)

(56) References Cited

U.S. PATENT DOCUMENTS 5,123,687 A * 6/1992 Pfeiffer ................. E05B 1/0092
                                                292/336.3
5,901,991 A * 5/1999 Hugel ................. G07C 9/00182
                                                292/201

(Continued)

FOREIGN PATENT DOCUMENTS

CN      1961128       5/2007
CN      101084355     8/2011
(Continued)

OTHER PUBLICATIONS

Notification of Office Action and Search Report dated Sep. 30, 2018 From the State Intellectual Property Office of the People's Republic of China Re. Application No. 201580050269.3 and Its Translation Into English. (12 Pages).

(Continued)

*Primary Examiner* — Nathan Cumar

(57) ABSTRACT

The invention relates to a handle device (10) for a closing device (80) for a movable part (70), such as a door, flap or the like, of a vehicle (100) comprising a handle part (20) which can be supported in a movable manner relative to the movable part (70). The closing device (80) can be connected to the handle part (20) via a connection element (16), and the handle part (20) is used to actuate the closing device (80). The handle part (20) can be moved at least between a rest position (Ia) and an operating position (Ib). In the rest position (Ia), the handle part (20) can be designed to be flush with the outer contour of the movable part (70) in particular, and in the operating position (Ib), the handle part (20) can protrude from the movable part (70) such that the handle part (Continued)

(20) can be gripped by an operator. According to the invention, the handle part (20) can be moved from the operating position (Ib) into an additional trigger position (Ic), in which a mechanical actuation of the handle part (20) can be transmitted to the connection element (16), whereby the closing device (80) can be actuated.

23 Claims, 8 Drawing Sheets

(51) Int. Cl.
*B60Q 1/26* (2006.01)
*E05B 79/20* (2014.01)
*E05B 81/90* (2014.01)

(58) Field of Classification Search
CPC .......... E05B 77/00; E05B 85/14; E05B 85/16; E05B 85/18; B60Q 1/2669; B60Q 3/267; B60Q 5/00
USPC ....................................... 292/336.3
See application file for complete search history.

(56) References Cited

U.S. PATENT DOCUMENTS

| | | | | |
|---|---|---|---|---|
| 6,112,564 | A * | 9/2000 | Rathmann | E05B 81/66 292/201 |
| 8,985,648 | B2 * | 3/2015 | Muller | E05B 85/107 292/336.3 |
| 2013/0121008 | A1 * | 5/2013 | Muller | E05B 85/107 362/501 |
| 2013/0127185 | A1 * | 5/2013 | Lang | E05B 81/77 292/336.3 |
| 2013/0241215 | A1 | 9/2013 | Halliwell et al. | |

FOREIGN PATENT DOCUMENTS

| | | |
|---|---|---|
| DE | 4002963 | 7/1991 |
| DE | 102010016869 | 11/2011 |
| GB | 2477085 | 7/2011 |
| WO | WO 2008/129003 | 10/2008 |
| WO | WO 2016/041996 | 3/2016 |

OTHER PUBLICATIONS

International Search Report and the Written Opinion dated Dec. 1, 2015 From the International Searching Authority Re. Application No. PCT/EP2015/071142 and Its Translation of Search Report Into English. (13 Pages).
Notification of Office Action and Search Report dated May 31, 2019 From the State Intellectual Property Office of the People's May Republic of China Re. Application No. 201580050269.3 and its English Translation (5 Pages).
Notification of Office Action Report dated Aug. 8, 2019 From the China National Intellectual Property Administration Re. Application No. 201580050269.3 and Its Translation Into English. (7 Pages).

* cited by examiner

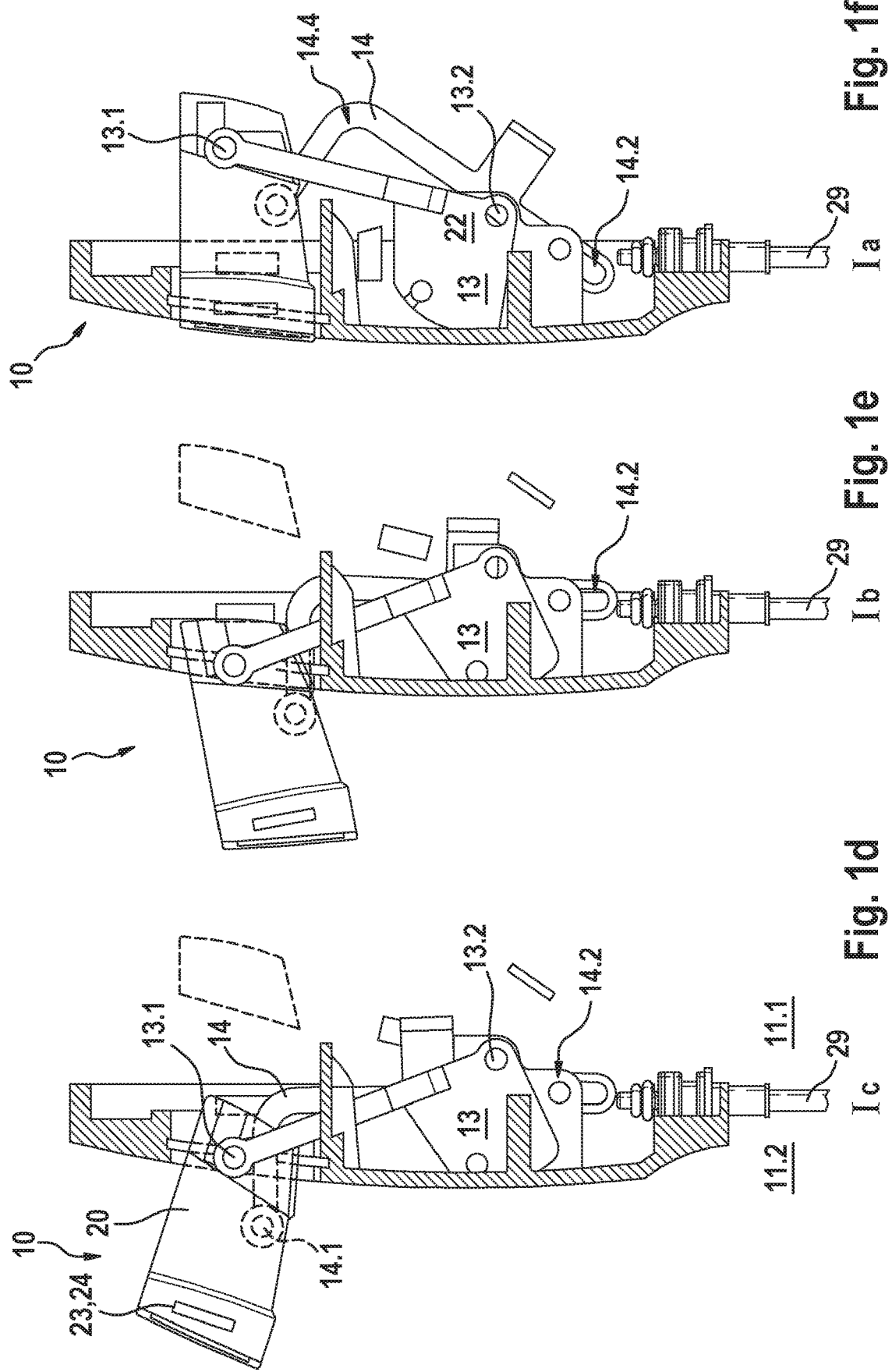

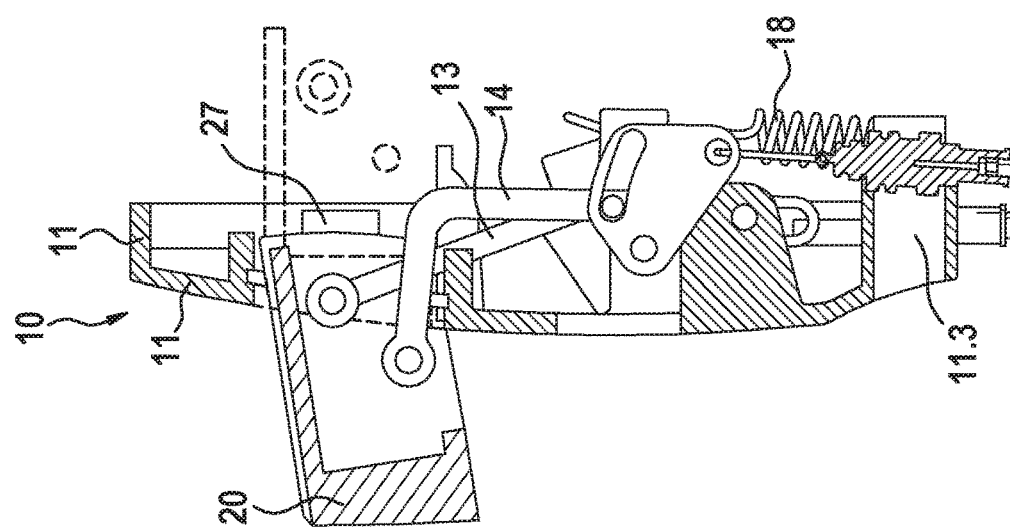
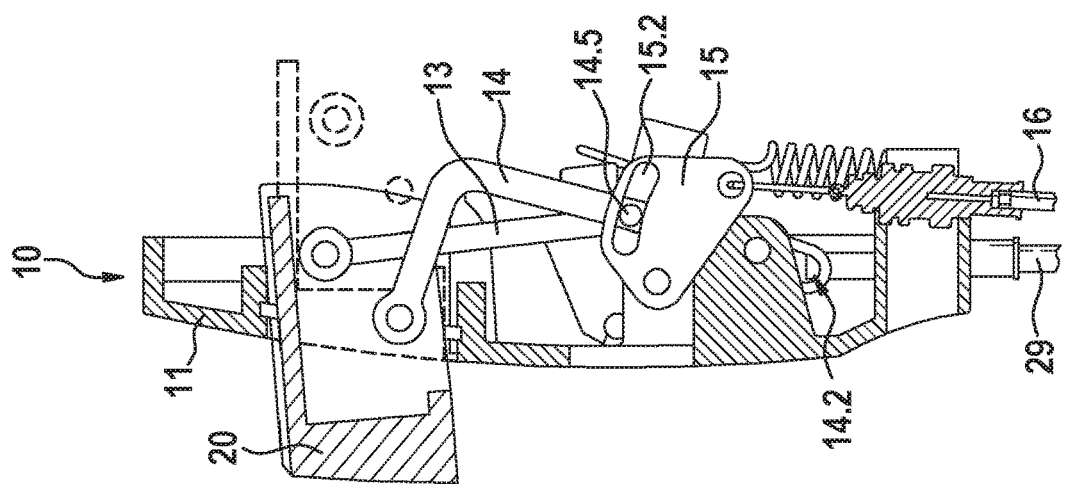
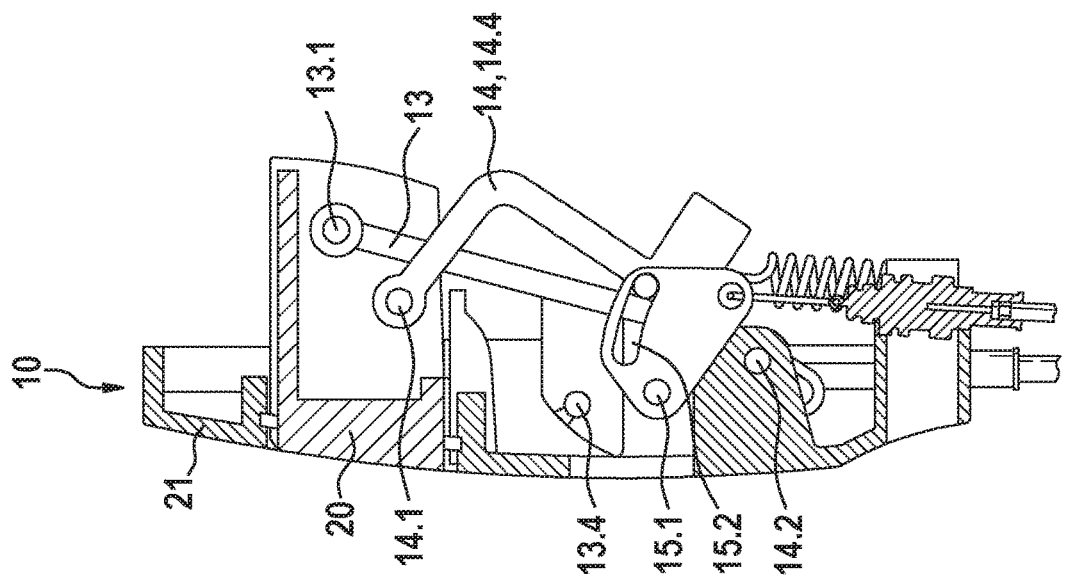

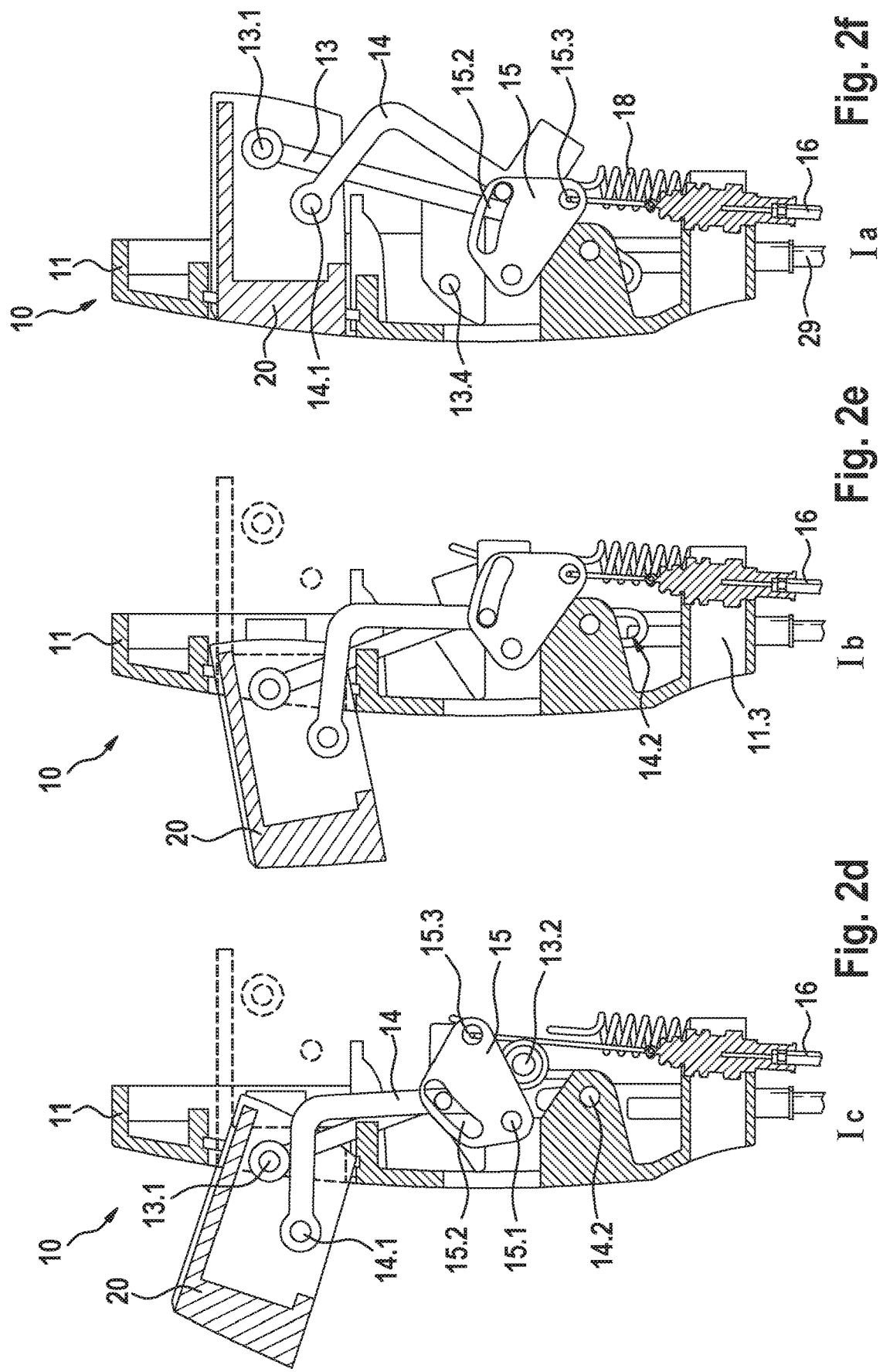

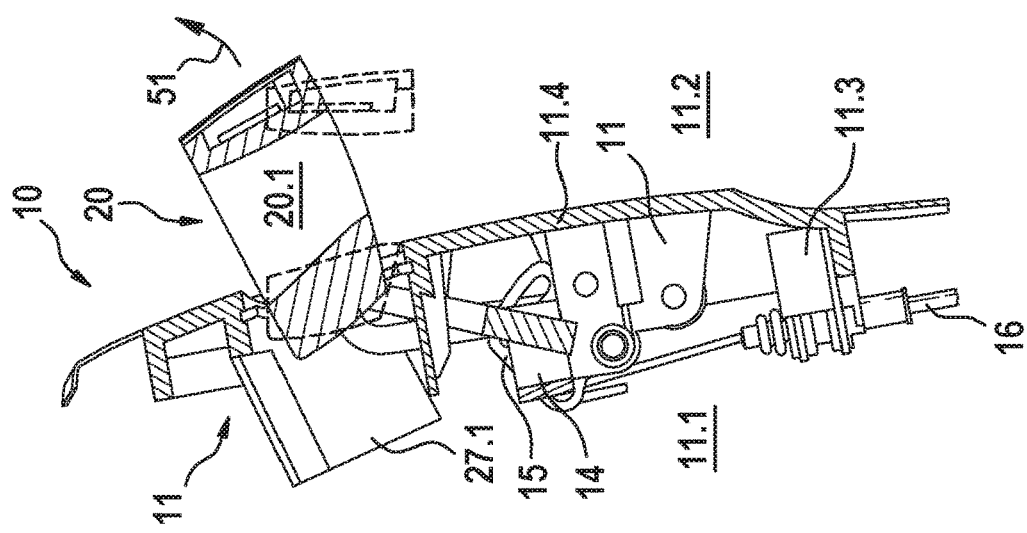
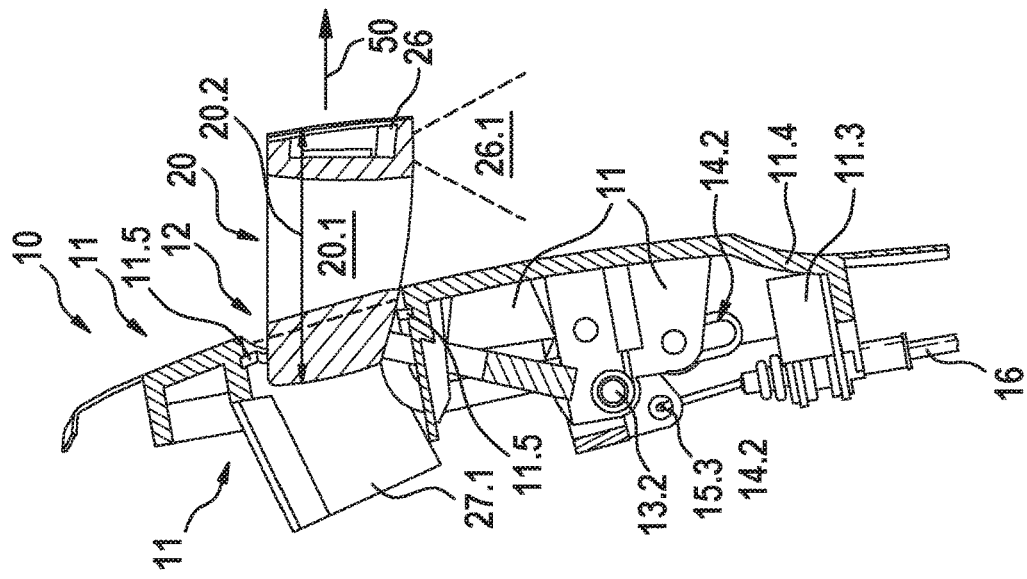
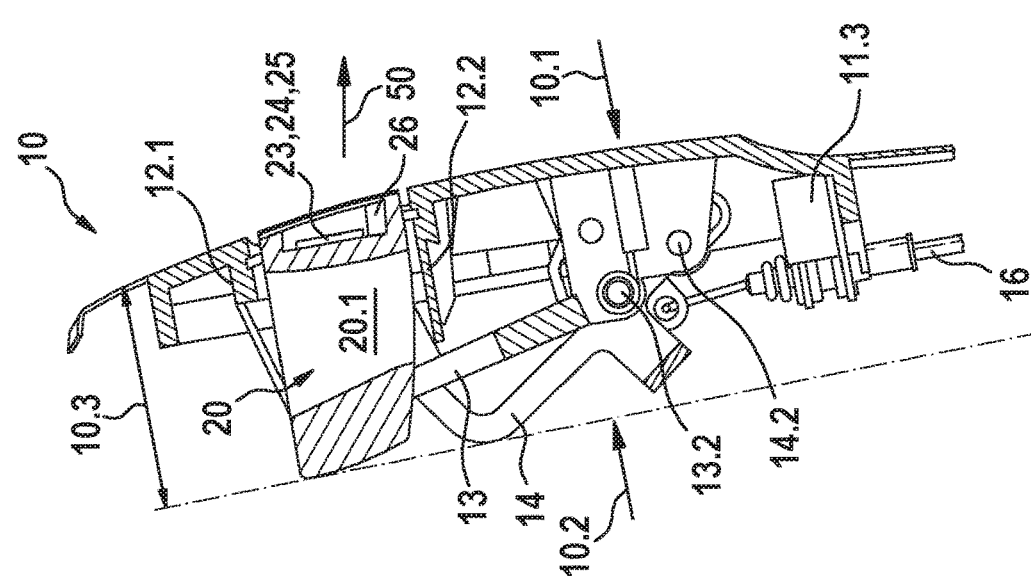

FLUSH COMFORT HANDLE

RELATED APPLICATIONS

This application is a National Phase of PCT Patent Application No. PCT/EP2015/071142 having International filing date of Sep. 15, 2015, which claims the benefit of priority of German Patent Applications Nos. 20 2014 010 524.3 filed on Sep. 18, 2014, and 10 2015 104 545.1 filed on Mar. 25, 2015. The contents of the above applications are all incorporated by reference as if fully set forth herein in their entirety.

The present invention relates to a handle device for a closing device for a movable part, such as a door, flap or the like, of a vehicle according to the preamble of claim 1. For this purpose, a handle part is used that is supportable in a movable manner relative to the movable part, the closing device being connectable to the handle part via a connection element, and the handle part being used to actuate the closing device. The handle part can even be moved back and forth between a rest position and an operating position. In the rest position, the handle part can in particular be designed to be flush with the outer contour of the movable part, which means that the handle part is aligned more or less flush with the outside of the movable part. In the operating position, the handle part can protrude from the movable part such that the handle part can be gripped by an operator. Furthermore, the present invention relates to a method for actuating a handle device for a closing device for a movable part according to the preamble of claim 20.

FIELD AND BACKGROUND OF THE INVENTION

Flush outer door handle devices on cars are already known from the prior art. In particular, door handle devices are used for this purpose that cooperate with an electro-mechanical closing device. In this case, the handle device only needs to move from its rest position to the operating position in which the operator then triggers an opening signal or trigger signal for the electro-mechanical closing device by simply touching or pressing a button then releasing the movable part, allowing it to be opened by the operator. The operator can grab the extended handle part in the operating position to swing up the movable part.

However, such door handle devices have the disadvantage that the electro-mechanical closing device cannot easily be actuated in the event of a vehicle power failure. Such handle devices often also require a large installation space, which is tight, particularly in the case of car doors as a movable part. It is often not possible to arrange such door handle devices anywhere on a car door because there is often insufficient space.

SUMMARY OF THE INVENTION

Object of the present invention is thus to provide a handle device and a method for actuating such a handle device that at least partially eliminates the disadvantages of the prior art. In particular, an object of the present invention is to create a purely mechanical handle device that provides a high level of operating comfort for the operator. Furthermore, an object of the present invention is in particular for the handle device according to the invention to be arrangeable at any point on the movable part, in particular a car door, flap or the like. In addition, an object of the present invention is to improve the aerodynamics of the vehicle with such a handle device and to reduce the risk of accidents, particularly for pedestrians.

The aforementioned object is solved by a handle device having the features of the independent device claim, in particular having the features of the characterizing part. In particular, a method for actuating such a handle device having the features of claim 20, in particular the features of the characterizing part, is suggested to solve the object. Preferred further embodiments of the invention are listed in the dependent device and method claims. Features that were disclosed with regard to the handle device according to the invention also apply to the actuating method and vice versa. Furthermore, the actuating method according to the invention of the handle device according to the invention can be realized.

In the text below, geometric information regarding the handle device according to the invention is always described for the handle device in its assembled state. Furthermore, such geometric information relates to the installation situation of the handle device according to the invention on the vehicle, as shown by way of example in the figures.

In the handle device according to the invention for a closing device for a movable part, such as a door, flap or the like, on a vehicle, a handle part is used that is supportable in a movable manner relative to the movable part. This handle part is connectable to the closing device via a connection element and serves to actuate the closing device when an operator operates the handle part. The handle part is movable at least between a rest position and an operating position, wherein in the rest position, the handle part can in particular be designed to be flush with the outer contour of the movable part, and wherein in the operating position, the handle part can protrude from the movable part such that the handle part can be gripped by the operator. "Flush with the outer contour" means that the handle part is integrated more or less flush in the outside or surface of the movable part. The handle part therefore does not protrude from the movable part in a disturbing manner when it is not being used and remains in its rest position. The aerodynamics of the vehicle in this area are therefore improved considerably, which also prevents disturbing wind noises from occurring. Furthermore, injury to pedestrians is also reliably prevented, because here the handle part also does not protrude from the movable part in a disturbing manner. Moreover, it is provided in the handle device according to the invention that it is possible to move the handle part from its operating position into an additional trigger position in which a mechanical actuation of the handle part is transferable to the connection element, allowing the closing device to be actuated on its own. By transferring the handle part from the operating position to the additional trigger position, an actuating force is transferred to the closing device via the connection element, allowing the closing device to be opened. The closing device releases a rotary latch, which results in a positive connection with a U-shaped bracket being released on the vehicle such that the movable part can itself be opened after the closing device is opened. For this purpose, an additional pull on the movable part by the operator via the handle part is necessary. For this purpose alone, it is necessary for the handle part to protrude from the movable part in its operating position in a grippable manner. The purely mechanical actuation of the closing device has the advantage that the movable part can still be opened comfortably in a simple manner even if the power of the vehicle electronics or electronics for the handle device fails.

Moreover, it can be provided in the handle device according to the invention that the handle part can move linearly between the rest position and the operating position. This means that the handle part covers the shortest possible movement path between the rest position and the operating position, which allows the design of the entire handle device to be as compact as possible and its installation depth to be minimized. Moreover, it is possible for the handle part to be arcuately movable between the operating position and the trigger position, in particular arcuately movable upward or downward. Because the handle device is arranged quite low on the vehicle for an adult, an arcuate upward movement of the handle part between the operating position and the trigger position corresponds to ergonomic and easy operation by the operator. This significantly improves the operating comfort of the handle device. Furthermore, the pulling force on the handle part between the operating position and the outer position can be optimized because of the special kinematics inside of the handle device such that a maximum pulling force is transferable to the purely mechanical closing device via the provided connection element. A gentle pulling force on the handle part is therefore enough to open the closing device in a purely mechanical manner.

Furthermore, it is possible in the handle device according to the invention that the handle part is supportable on the movable part by a handle support. The handle part is thus not arranged directly on the movable part, but is arranged indirectly on it or connected to it via the handle support. It can also be provided that the handle part is arranged on the handle support in a movable manner via two levers. These two levers can be arranged next to each other and embrace the handle part on both sides to achieve particularly stable guidance for the handle part to the handle support. This also reliably prevents the handle part from tilting while it is being adjusted. In addition, a linear guide between the handle support and the handle part would, for example, have the disadvantage that it could freeze rapidly in corresponding weather conditions. Thus, it is useful if the handle part is held on the handle support in a movable manner only via the two levers. It is possible that at least one of the levers is movably connected to the handle support on both sides via a continuous axle. Because of the continuous axle, it is possible to realize a simple installation and particularly reliable arrangement of the two levers on the handle support. Furthermore, the pivot axles can also be used to hold spring elements, which will be described in more detail below. Moreover, the corresponding axles also serve to increase the stability of the entire handle device.

Furthermore, it is possible within the scope of the invention that the two levers for guiding the handle part have pivot points arranged differently from one another. What is meant by the pivot points arranged differently from one another is that the corresponding points are therefore not located on a common pivot axle. Rather, thanks to the special kinematics, the handle part initially covers the linear movement between the rest position and the operating position to then make an arcuate movement possible between the operating position and the trigger position. Moreover, it is possible that the two levers are arranged side by side and not directly connected to each other. Rather, a connection of the levers is made via the arrangement on the handle part or handle support, the connection being indirect in any case. The two levers can also embrace the handle part on both sides, in particular from the outside. The two levers are designed essentially H-shaped or U-shaped, the handle part being arranged between the parallel limbs of the two levers. The concrete design of the levers already reliably prevents the aforementioned problem of the tilting of the handle when it extends out and when it is actuated.

It is also possible according of the invention that the first lever is designed as a drive lever for moving the handle part at least between the rest position and the operating position. A driving force acting on the drive lever or the first lever can serve to automatically or independently transfer the handle part from its rest position to the operating position. For this purpose, a first spring element can act on the first lever in such a way that the handle part is independently transferable from the rest position to the operating position. The spring element thus serves to generate the aforementioned driving force. This design has the advantage that no motor power is needed, for which electrical energy must, if applicable, be provided, to transfer the handle part from the rest position to the operating position.

Furthermore, it is possible according to the invention that a drive acts on the first lever, in particular an electromechanical drive in the form of an electric motor, allowing the handle part to be moved at least between the rest position and the operating position. Here, it is advantageous if the drive transfers the first lever from the operating position to the rest position, which means that the drive effectively pulls in the handle part and does not extend it. In particular, it is possible that the drive generates a driving force that is oriented opposite to a spring force from the first spring element. Thus, the spring serves to automatically extend the handle part from the rest position to the operating position, and the driving force from the drive pulls the handle part from the operating position back to the rest position against the spring force of the first spring element. Ideally, the drive is designed to be self-locking such that it can be de-energized and still remains in the rest position once the handle part has reached its rest position. It is also possible for the handle part to be locked in the rest position such that only the lock must be overcome for the first spring element to automatically transfer the handle part from the rest position to the operating position.

Within the scope of the invention it can also be envisaged that the second lever is designed as an actuating lever to transfer the mechanical movement of the handle part between the operating position and the trigger position to the connection element. Thus, the second lever does not only serve to guide the handle part, but also simultaneously serves to transfer the particularly arcuate movement of the handle part to the connection element. An actuation of the connection element can also be possible only after the handle part has reached the operating position. Thus, the initial movement of the second lever between the rest position and the operating position of the handle part does not cause any mechanical transfer to the connection element. This ensures that the movable part stays closed under any circumstances thanks to the closing device, even if the handle part is initially transferred from its rest position to the operating position. Moreover, it is possible that the second lever in particular undergoes a vertical movement towards the handle support from the operating position to the trigger position. In other words, the lever is raised towards the trigger position in relation to the handle support by switching to the operating position. Precisely this lever movement can ideally be transferred to the connection element to actuate the closing device.

Moreover, within the scope of the invention it can be envisaged that the second lever has an angular-shaped, in particular rectangular-shaped, design. Thanks to this angular arrangement of the second lever, the movable handle part can easily be arranged on the handle support in a movable manner. In the case of the second lever, the pivot points relative to the handle support can each be provided at a distal distance from the angle or at the end of the angle. As a result, the effect of the second lever is utilized particularly effectively. Ideally, at least one pivot point of the second lever relative to the handle support can be designed as a pivot bearing relative to the handle support to enable the aforementioned vertical movement of the second lever relative to the handle support. The lower pivot point is advantageously designed as a slot bearing on the second lever that cooperates with a fixed pivot point relative to the handle support in a positive-locking manner. An upper pivot point on the second lever can, as a fixed pivot point relative to the handle support, be designed as a pivot bearing. As a result of the interaction of the two first and second levers, particularly elegant kinematics are generated for guiding and supporting the handle part in relation to the handle support. In particular, the installation space of the handle device according to the invention is thus designed minimally, allowing the entire handle device to be placed anywhere on the movable part.

Furthermore, it can be envisaged on the basis of the invention that the second lever indirectly cooperates with the connection element mechanically via a transfer lever, in particular to at least partially decouple the lever from the connection element.

Precisely because of the use of the transfer lever, the pulling force on the transfer lever via the second level, which is exerted on the handle part by an operator, can be increased, which in turn increases the operating comfort of the entire handle device. Moreover, a second spring element can cooperate with the transfer lever to move the transfer lever to its rest position. The second spring element is supposed to prevent small vibrations on the handle part, which can in particular act in the trigger position, from causing an unintended triggering of the closing device. An arcuate guide between the second lever and the transfer lever can also be present to form a freewheel between the second lever and the transfer lever. This freewheel makes it possible for the second lever to not generate any mechanical transfer to the transfer lever when the handle part moves from the rest position to the operating position. Otherwise, erroneous triggering can occur, which is avoidable in this case. The transfer lever can advantageously have a fixed pivot point relative to the handle support. Furthermore, it is useful if the transfer lever rests against a stop on the handle support at least in its rest position. A second stop can also be provided between the handle support and the transfer lever so that the transfer lever is not rotated too far around the existing pivot point with the handle support, which could result in the connection element being overloaded.

For the handle part to even be able to extend out of the handle support, an opening is provided in the handle support, the handle part concealing the opening both in the operating position and in the trigger position. This excludes manipulations of the handle device according to the invention. It can in particular be envisaged that the opening has an edge that extends into the inside of the handle support to achieve improved protection. The edge can simultaneously serve as reinforcement for the opening and can also improve the tilt stability of the handle part when it moves relative to the handle support.

It can advantageously be provided that an edge of the opening in the handle support for the handle part takes the form of a channel, in particular extending fully into the interior, to improve the aforementioned breakage protection of the handle device according to the invention and of the closing device provided in the movable part. The edge can also have a guiding means to guide the handle part. This guiding means can optionally be provided for the two levers and be arranged either on the left and/or right side or above and/or below between the edge and the handle part. A groove can be present as a guiding means between the handle part and the edge along with a guide pin as a counter guiding means. It is also possible that a seal in the handle part cooperates with the edge of the opening, at least in the rest position, to create a seal. Ideally, the seal is provided between the edge and the handle part in such a way that a seal of the handle part is also present in the operating position. It is also possible that the seal is arranged on the outside of the handle part and cooperates with the edge of the opening. The seal is supposed to prevent moisture, dirt and grime as well as other interfering substances from penetrating into the interior of the handle device according to the invention. Furthermore, wind noises can be avoided reliably thanks to the handle device. Of course, two seals can also be provided.

To increase the safety of the handle device according to the invention, at least one crash barrier and/or one counterweight can be provided. The crash barrier and/or the counterweight are supposed to serve to, if possible, fix the handle part in the rest position in the event of a crash. The crash barrier can in particular block the handle part relative to the handle support in a positive-locking manner, the positive connection between the crash barrier and the handle part also being possible on one of the two levers. However, the crash barrier can also directly cooperate with the handle part in a positive-locking manner in the rest position. The aforementioned counterweight can also be provided on at least one of the two levers to produce its desired effect. It is possible that the counterweight is integrated in at least one of the two levers.

To further improve the comfort of the handle device according to the invention, it can be provided that at least a first sensor element is present to control the device, a security system and/or the vehicle electronics. Thus, for example, it is possible that the sensor element allows the approach of the operator to be detected, which makes it possible for the handle part of the handle device to be independently transferred from the rest position to the operating position. This approach can also, for example, trigger communication between a vehicle-side security system and a mobile ID transmitter that the operator carries to, for example, unlock the handle device. The sensor element can be designed at least as a proximity sensor, engaging sensor, antenna, signal transmitter, light sensor or temperature sensor. The various sensor elements allow various comfort preferences to be realized in the handle device according to the invention. Thus, for example, the temperature sensor can ensure that the handle device is heated up or at least subject to vibrations at temperatures around the freezing point. The light sensor can serve to switch on a lighting unit if the lighting conditions require it. The antenna can be used for communication with the mobile ID transmitter or other information transmitters. Advantageously, at least one control unit is also provided in the handle device, the control unit having a data connection to the sensor element. This control unit can be used to receive and evaluate the data of the sensor element to trigger the corresponding desired functions in the handle device according to the invention or of the vehicle electronics or of the security system.

To further improve the comfort of the handle device, at least two sensor elements can be provided, at least one sensor element being designed as a capacitive sensor to, for example, detect the approach of an operator towards the handle device by measurable means. It is also possible that at least both sensor elements are designed as capacitive sensors, wherein the first sensor element detects the approach of an operator towards the vehicle and the second sensor element detects when an operator reaches into a handle recess of the handle part. In addition, a further sensor element can also be provided, such as a Hall sensor that, for example, monitors the position of the handle part or an antenna that enables a data exchange with an external ID transmitter. On the basis of this information, targeted functions can be realized in the handle device according to the invention or in the vehicle.

It is also possible for the handle device according to the invention to have at least one lighting unit that is at least integrated in the handle part or in the handle support to realize front field illumination in front of the movable part. The lighting unit can also be controlled by the aforementioned control unit, for example, via a sensor element, for example, as a twilight sensor. The lighting unit itself can emit a cone of light, a light source being used to generate light. The light source can take the form of an LED, OLED, in particular white in color.

To further ensure the operation of the handle device according to the invention in the event of a power failure in a vehicle, a mechanical lock cylinder can be provided in the handle device that can be arranged behind the handle part from the outside or behind a flap or cap. This mechanical lock cylinder can allow the handle device to be unlocked in a purely mechanical manner to thus also be able to actuate the purely mechanical closing device in the event of a power failure. Moreover, a push button, a flap or a cap can be used to extend the handle part into its operating position in case of an emergency. This push button, flap or cap is ideally arranged in direct proximity to the extendable handle part, an actuation of the push button, flap or cap serving to transfer the handle part from the rest position to the operating position. The spring element that was also mentioned is precisely what supports the desired emergency actuation of the handle part. Thus, it can, for example, be envisaged that by pressing the push button, the cap or the flap, the lock cylinder is released for use with a key and the handle part simultaneously moves from its rest position to the operating position. Of course, the aforementioned flap or cap can also be rotated, pivoted or pulled to obtain the desired extension of the handle part in case of an emergency.

To further improve the comfort of the handle device, it can be provided that the handle part has at least one single-sided handle recess. This handle recess serves to make it possible for an operator to reach into the handle part with his hand. The engagement recess can advantageously also be open on both sides. This allows an operator to grasp the handle part from above or from below. It is also possible that the engagement recess has a continuous design such that the operator can reach through the handle part.

To keep the installation space of the handle device according to the invention as small as possible, it can be provided that the handle part has a maximum handle depth of 45 mm, preferably 40 mm. Optimum comfort of the handle part, even for adults with large hands, is still possible in this specified handle part depth, and the handle device can still be placed anywhere on the movable part. Furthermore, it is useful that an installation space of the handle device has a maximum installation depth of 65 mm, preferably 60 mm and particularly preferably 55 mm. It is thereby to say that the smaller the maximum installation depth is, the better and more easily the handle device can be placed on the movable part based on its existing installation space. The aforementioned installation depth can be understood as the shortest distance from a front side of the handle device to a rear side of the handle device. The front side and the back side can also refer to fictitious planes because the handle device does not necessarily need to have a housing with clear geometric structures. An example for the determination of the installation depth in the present case is depicted in the attached figures.

Furthermore, it is optionally possible that at least one connection element is designed as a flexible connection element, in particular as a Bowden cable, chain or control cable. The use of the flexible connection element allows a clear spatial separation to be made between the handle device according to the invention, the optionally provided drive and the closing device. The device according to the invention can thus also be used for various installation situations and vehicles. The use of a Bowden cable as a flexible connection element is particularly cost-effective and technically elegant because the Bowden cable comprises a sleeve having a guided core such that the connection element is reliably prevented from catching in the interior of the movable part.

Preferably, at least one holding means for holding at least one connection element is provided on the handle support. If the handle device according to the invention is operated by a drive, two holding means are advantageously provided for at least two connection elements in the handle support. The arrangement of the holding means on the handle support allows a self-sufficient design of the handle device in relation to the movable part to be achieved.

According to the invention, it can also be provided that the handle support and the handle part are designed as an injection molded part, in particular a plastic injection molded part. This makes cost-effective manufacturing feasible, wherein plastics in particular usually have a neutral design for metrological applications. In particular, the handle support (but also the handle part) can have a fiberglass-reinforced plastic to achieve increased stability. Furthermore, the handle support can also be designed as a lightweight component, in particular made of lightweight metal. ZAMAC, for example, comes into consideration as the alloy. Ideally, the handle part has a cavity in which, among other things, the sensor elements, the control unit, the lighting unit and/or the like can be housed.

The present invention also relates to a vehicle having at least one handle device according to the invention.

Moreover, the present invention relates to a method for actuating a handle device according to claim 20. The handle device according to the invention is advantageously used here. The following steps can be executed in the case of the method according to the invention:

a) Linear extension of the handle part from the rest position into the operating position b) Arcuate pivoting of the handle part from the operating position to the trigger position c) Linear retraction of the handle part from the operating position into the rest position.

The method steps a) to c) allow for the particularly comfortable operation of the handle device according to the invention, which is also very advantageous from an ergonomic point of view. Furthermore, the described method can also be supplemented or completed with further steps:

d1) Detection by a sensor element of the approach of an operator d2) Detection by a sensor element of an attempt by an operator to reach into the handle part e) Control at least of the security system or the vehicle electronics, in particular after a detection according to step d1) or d2)

f) Wake-up of a mobile ID transmitter of a security system g) Front field illumination by a lighting unit.

In the method according to the invention, it is provided for extending the handle part that step a) is done initially and then, if applicable, step b) or, if no actuation of the handle part is desired, step c) is done directly. If step b) takes place, the handle part must, of course, also initially be transferred from the trigger position to the operating position. Only then can the handle part be retracted linearly from the operating position into the rest position in step c). To improve the comfort of the method according to the invention for an operator, an approach by the operator can be detected, for example, in steps d1) and d2), as well as an attempt to reach into the handle part, which, if applicable, allows step a) to be initiated or executed automatically. Steps e), f) and/or g) can be carried out at the same time or consecutively such that an operator only needs to approach the handle device according to the invention, the handle device being extended into the operating position and being grippable by the operator according to step a) to transfer the handle part to the trigger position, resulting in the closing device on the movable part being actuated in a purely mechanical manner. At the same time, the security system or the vehicle electronics can be controlled to execute the aforementioned or additional functions. These functions can be the awakening of a mobile ID transmitter of a security system according to step f) or front field illumination by the lighting unit in the dark according to step g). In addition, further functions are, of course, possible, such as the unlocking of the handle device according to the invention after the successful authentication of a mobile ID transmitter.

BRIEF DESCRIPTION OF SEVERAL VIEWS OF THE DRAWINGS

Further measures and advantages of the present invention arise from the claims, the description below and the drawings. Likewise, disclosed features of the device according to the invention also apply to the method according to the invention and vice versa. In the drawings, the invention is depicted in various exemplary embodiments. The features mentioned in the claims and the description can each be essential to the invention individually or in any combination without, however, departing from the scope of the present invention.

In the figures:

FIGS. 1a, 1b, 1c, 1d, e and 1f show a first exemplary embodiment of the handle device according to the invention in a sectional view in the movement sequence from its rest position through its operating position to its trigger position and back again, FIGS. 2a, 2b, 2c, 2d, 2e and 2f show a comparable exemplary embodiment of the handle device according to the invention from FIGS. 1a, 1b, 1c, 1d, 1e and 1f in a modified sectional view, FIGS. 3a, 3b and 3c show a comparable exemplary embodiment from FIGS. 1a, 1b, 1c, 1d, 1e, 1f, 2a, 2b, 2c, 2d, 2e and 2f in a further sectional view.

In the subsequent figures, identical reference characters are used for the same technical features, even for those of different exemplary embodiments of the invention.

DESCRIPTION OF SPECIFIC EMBODIMENTS OF THE INVENTION

Figure 1A:
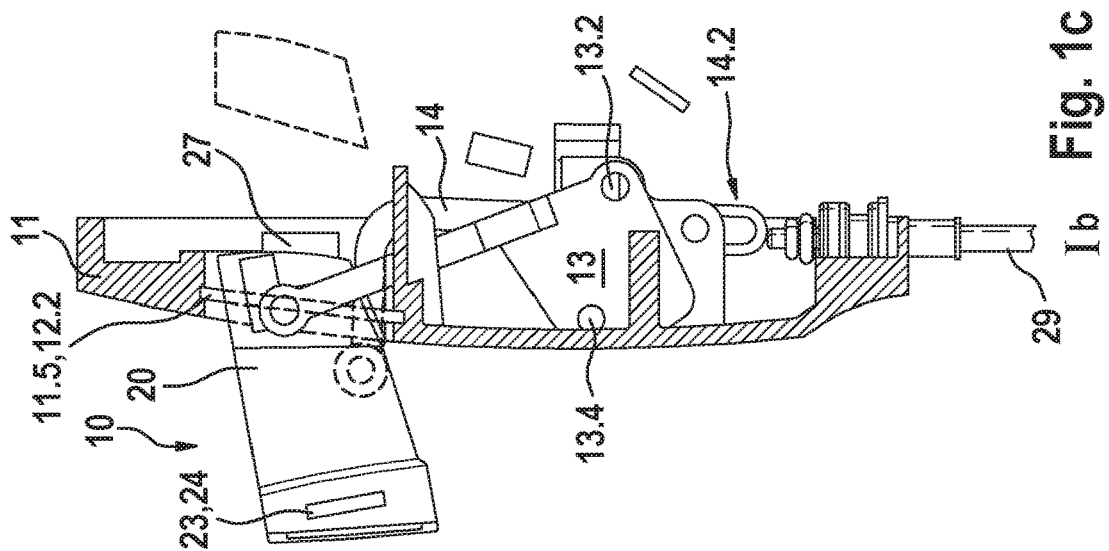
Figure 1B:
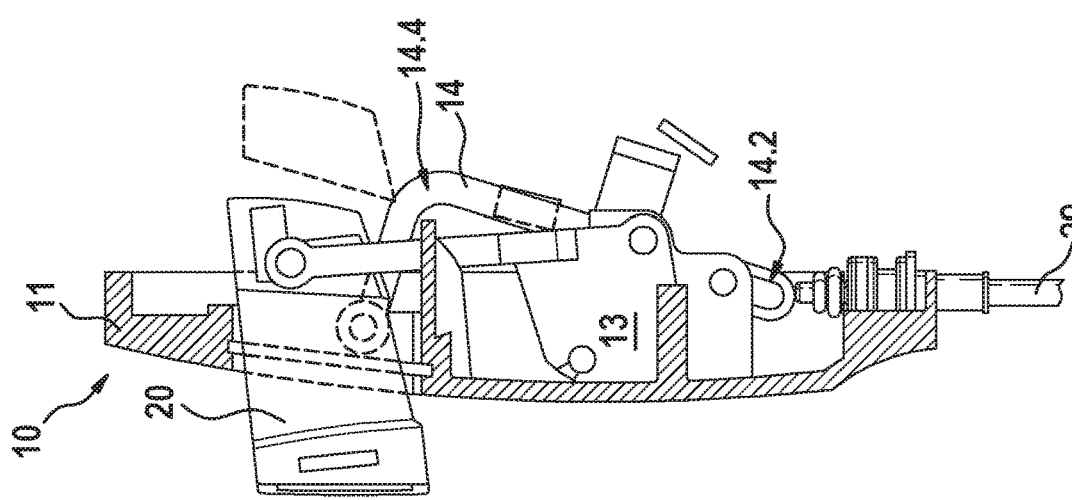
Figure 1C:
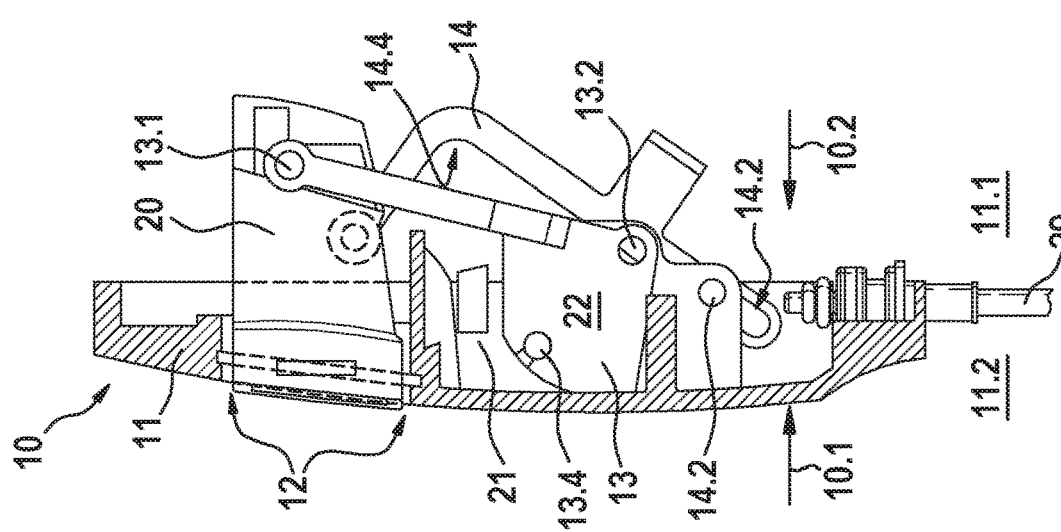

FIGS. 1a to 1f show a handle device 10 according to the invention in a longitudinal section during the movement sequence of a handle part 20 from its rest position Ia through its operating position Ib into its trigger position Ic and back again. Consequently, FIGS. 1a and 1f are identical because they each show the handle part 20 in its rest position Ia. FIGS. 1c and 1e are also essentially identical because they also both show the handle part 20 in the operating position Ib. The handle device 10 according to the invention has the extendable handle part 20, which is supported in the handle support 11 in a movable manner. The handle support 11 serves to arrange the entire handle device 10 on a movable part 70, in particular a door, a flap or the like of a motor vehicle 100 (see e.g. FIGS. 6 and 7). The handle support 11 itself has an opening 12 whose internal dimensions are essentially complimentary to the external dimensions of the handle part 20. The opening 12 itself is provided with an edge 12.1 to make it difficult for unauthorized people to reach into the handle device 10, in particular into the interior 11.1 from the outside 11.2. The handle device 10 itself has a front side 10.1 and a rear side 10.2, wherein the fictitious planes of the front side 10.11 and rear side 10.2 have a minimum clearance that is to be referred to as an installation depth 10.3 within the meaning of the invention. The corresponding installation depth 10.3 is, for example, depicted in FIG. 3a. As can further be seen from FIGS. 1a to 1d, the handle part 20 initially moves out of the handle support 11 through the opening 12 in a linear manner (see arrow 50). The handle part 20 is guided by at least the two levers 13 and 14, which are referred to as the first lever 13 and the second lever 14. The first lever 13 has a fixed pivot point 13.1 with the handle part 12. The second lever 14 also has a fixed pivot point 14.1 with the handle part 20. However, the two pivot points 13.1 and 14.1 within the scope of the depicted installation situation from FIG. 1 are arranged such that they are offset vertically and laterally with respect to each other. The lever 13 is rotatably connected to the handle support 11 with its end that faces away from the handle part 20 via a further fixed (lower) pivot point 13.2. Thus, the first lever 13 makes only a rotary movement around the fixed pivot point 13.2 with the handle support 11. The second lever 14, however, has only the upper, fixed pivot point 14.1 with the handle part 20 and is equipped with an elongated hole 14.2 at its end that faces away from the handle part 20, the elongated hole 14.2 cooperating with a fixed pivot point 14.2 in the form of a bearing journal on the handle support 11 to impart a rotational pivoting movement in this area. The second lever 14 has an angle 14.4 with two ends at which the two pivot points are distally arranged relative to the angle 14.4. During the movement of the handle part 20 from the rest position Ia to its operating position Ib, the second lever 14 initially only rotates around the pivot point 14.2 or the bearing journal 14.2. Only after the handle part 20 has been transferred from its operating position Ib to its trigger position Ic does the second lever 14 make a vertical movement that is made possible by the elongated hole 14.2. The movement of the handle part 20 in particular from the operating position Ib to the trigger position Ic provides for mechanical cooperation between the second lever 14 and a further transfer lever 15, which can be seen clearly in FIG. 2.

As already mentioned, the handle part 20 initially completes a linear movement 50 between the rest position Ia and the operating position Ib. When the handle part 20 moves further from the operating position Ib to the trigger position Ic, the handle part 20 transitions from the linear movement 50 to an arcuate (upward-oriented) movement 51 (see arrow 51). After the handle part 20 has been transferred to its trigger position Ic and a mechanical closing device 80 has been actuated by a connection element 16, the movable part 70 can be opened. To protect the handle device 10 in the interior 11.1 against external environmental influences insofar as possible, a seal 11.5 is provided along the circumference of the opening 12, in particular of the edge 12.1, the seal cooperating with the handle part 20 to close the opening 12. At the same time, the seal 11.5 can also be used as a guiding means 12.2 for the handle part 20. As can easily be seen in FIGS. 1c and 2c, a mechanical lock cylinder 27 is arranged on the handle support 11 next to the handle part 20. Usually, such a mechanical lock cylinder 27 is connected to the handle support 11 via a holder 27.1 or in a holder 27.1 (for the holder of the lock cylinder 27.1 see FIGS. 3 to 5).

Figure 6:
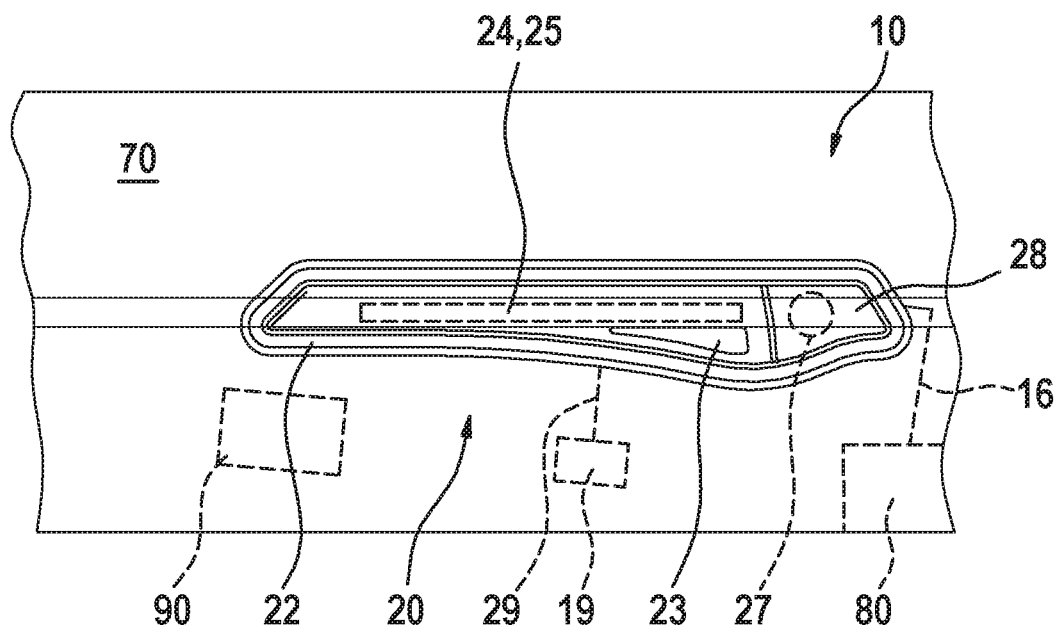
FIG. 6 shows a front view of a handle device according to the invention in the installed state and FIG. 7 shows a view of a vehicle, in particular a motor vehicle, having at least one installed handle device according to the invention.
Figure 7:
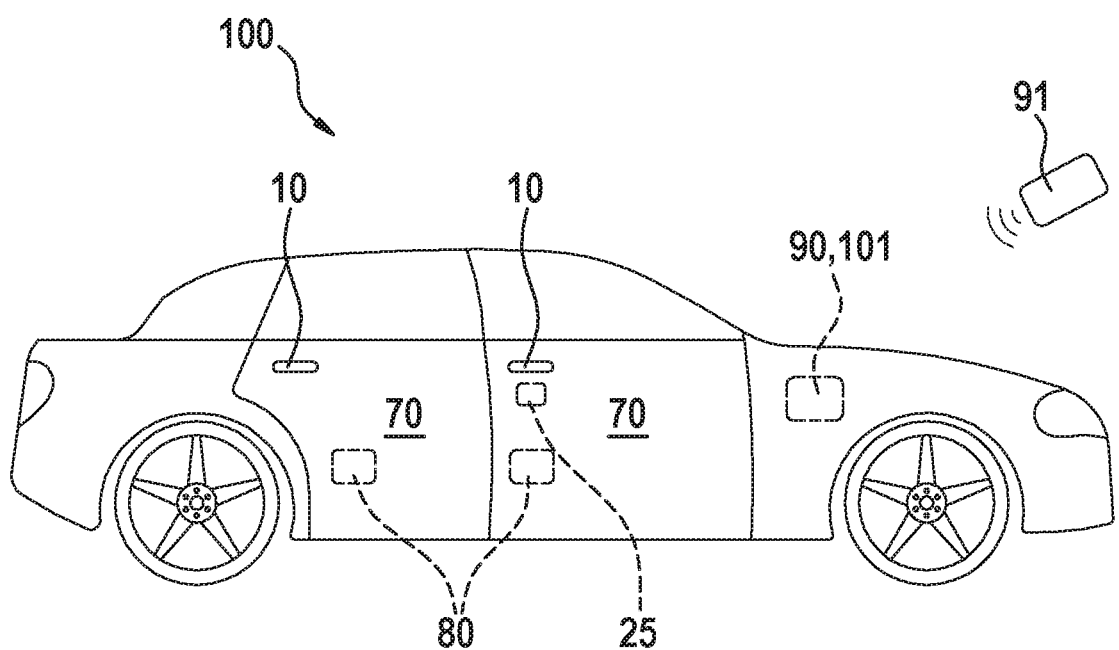

In FIGS. 1a, 1f as well as 2a and 2f, the handle part 20 is shown in the rest position Ia. In FIGS. 1b and 2b, the handle part 20 is shown in an intermediate position between the rest position Ia and the operating position Ib. In FIGS. 1c, 1e as well as 2c and 2e, the handle part 20 is in its operating position Ib. In FIGS. 1d and 2d, the handle part is shown in its trigger position 1c, the handle part 20 mechanically cooperating with the (purely) mechanical closing device 80 via the connection element 16, which is designed as a Bowden cable in the present case. The mechanical closing device 80 is indicated in FIGS. 6 and 7.

As can further easily be seen in FIG. 1, the lever 13 can be provided with a counterweight 22 to increase the safety of the door handle device 10 according to the invention in accidents. At the same time, the point of application 13.4 for an additional or further connection element 29 that cooperates with a drive 19 can be provided on the counterweight 22. The drive 19 can be configured as an electric motor and be controlled by a control unit 25 of the handle device 10.

In FIG. 1, the aforementioned drive 19 generates a pulling movement in the point of application 13.4 from lever 13 via the further connection element 29, which can in particular be designed as a Bowden cable. As a result, this lever 13 rotates counter-clockwise around its pivot point 13.2 and pushes the handle part 20 into its operating position Ib. If an operator wants to open the movable part 70, he must generate an arcuate rotary movement 51 of the handle part 20 to the trigger position Ic on the extended handle part 20 in the operating position Ib resulting in the lever 14 generating a vertical movement and rotating the transfer lever 15 around the fixed pivot point 15.1 from its rest position IIa to its trigger position IIb. In its rest position IIa, the transfer lever 15 hits against a stop of the handle support 11.

The manner of operation of the transfer lever 15 can be seen more clearly in FIG. 2. As can easily be seen on the basis of FIGS. 2a to 2c, a movement of the handle part 20 from its rest position Ia to its operating position Ib does not initially cause a movement of the transfer lever 15 because a catch 14.5 of the second lever 14 simply slides along in the arcuate slot guide 15.2 of the transfer lever and the aforementioned freewheel is thus formed. Only when the catch 14.5 of the second lever 14 has reached the end of the arcuate guide 15.2 of the transfer lever 15 in the operating position Ib of the handle part 20 can a further movement of the handle part 20 towards its trigger position Ic cause the catch 14.5 to move onto the transfer lever 15. The transfer lever 15 is then rotated counter-clockwise around its fixed pivot point 15.1 by the catch 14.5 of the second lever 14 according to FIG. 2. As a result of this, the point of application 15.3 for the connection element 16 is moved upward, whereby a pulling force is imparted on the connection element 16. The transfer lever 15 is advantageously spring-loaded by an additional spring element, whereby, in principle, the transfer lever 15 is pulled into its rest position IIa. The mechanical cooperation between the second lever 14 and the transfer lever 15 is clearly apparent from FIGS. 2d to 2f. It also becomes clear that the second 14 rises to the pivot point 14.2 or pivot pin 14.2 due to its elongated hole 14.2.

In FIGS. 3a, 3b and 3c, a further sectional view of the handle device 10 according to the invention is shown. The movement sequence of the handle part 20 from the rest position Ia through its operating position Ib into its trigger position Ic is shown. In this exemplary embodiment, a lighting unit 26 is arranged in the handle part 20 that can also optionally or additionally be arranged in the handle support 11. As can be seen on the basis of FIGS. 3b and 3c, the lighting unit 26 can emit a cone of light 26.1 to realize front field illumination. Once again, also apparent from FIGS. 3a to 3c is the manner of operation of the transfer lever 15, which cooperates with the connection element 16 for the mechanical closing device 80 via its point of application 15.3. The handle support 11 can additionally be provided with a panel 11.4 to elegantly cover the movable part 70 in the area of the handle device 10. Moreover, at least one holding means 11.3 is provided for the connection element 16 or 29 on the handle support 11. The corresponding holding means 11.3 for holding the connection element 16 on the handle support 11 can easily be seen in the sectional views of FIGS. 3a to 3c.

Moreover, the handle part 20 has an outward-oriented cavity in which the various sensor elements 23, 24, etc. can be arranged, in particular behind a lid or panel. The aforementioned control unit 25 can also be housed in this cavity, as is shown in FIG. 3.

Figure 4:
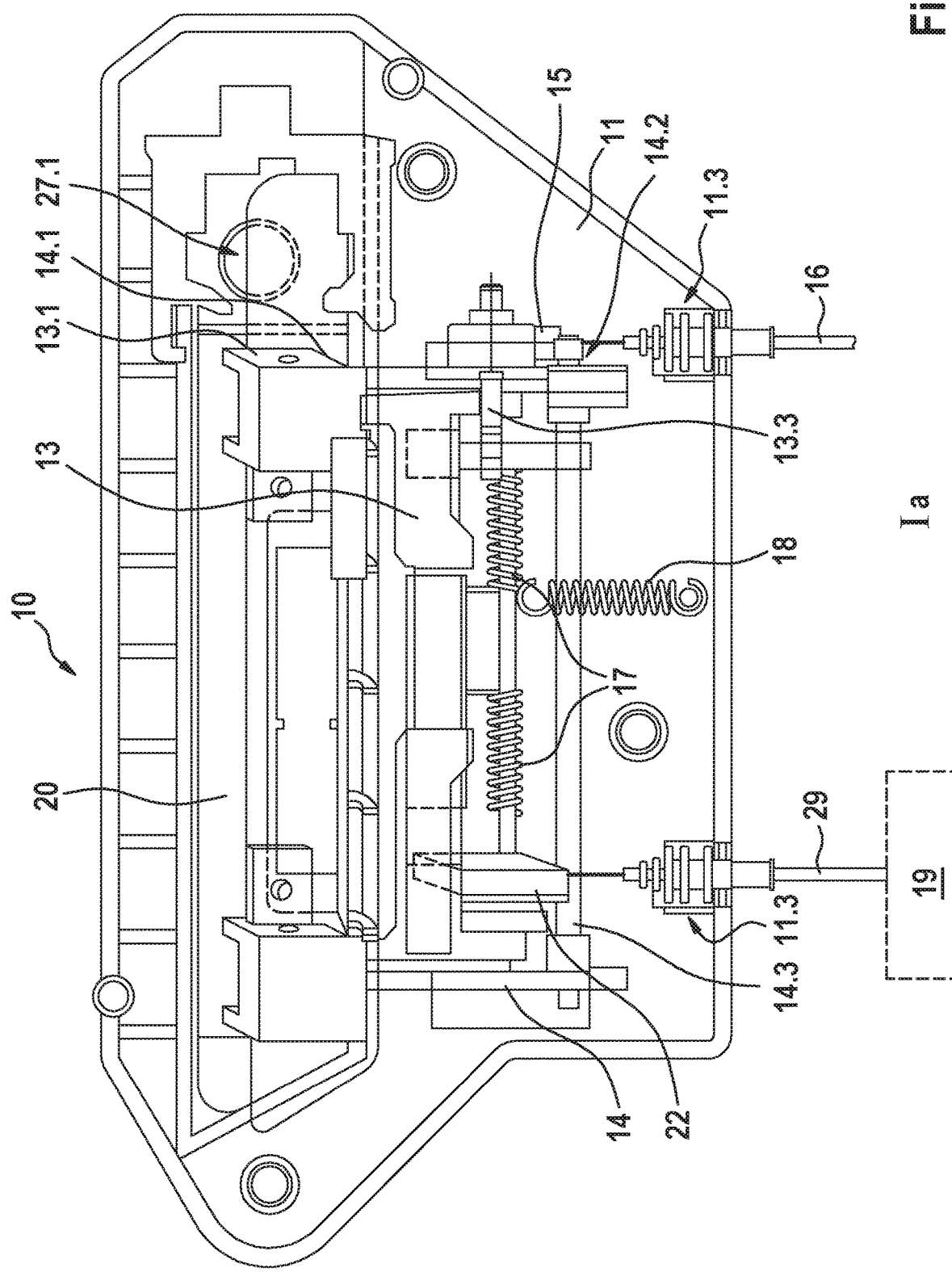
FIG. 4 shows a rear view of a further exemplary embodiment of the device according to the invention.

In the rear view of the handle device 10 in FIG. 4, it can also easily be seen that the first lever 13 and the second handle 14 are U-shaped or H-shaped. The handle part 20 is bordered or held on both sides with the two parallel limbs of the U-shaped or H-shaped lever 13, 14. The upper pivot points 13.1 of the first lever 13 and the pivot point 14.1 of the second lever 14.1 can easily be seen. The lower pivot points of the two levers 13 and 14 are formed by the axles 13.3 and 14.3, which each have a continuous design. The axle 13.3, which simultaneously serves as a pivot point 13.2 for the lever 13, is provided with a first spring element 17 as a coiled spring, whereupon the first lever 13 is spring loaded, resulting in the handle part 20 being automatically pushed from its rest position Ia to its operating position Ib by the first spring element 17. From this operating position Ib, the handle part 20 can also be pulled back again by the further connection element 29, which cooperates with the drive 19.

Figure 5:
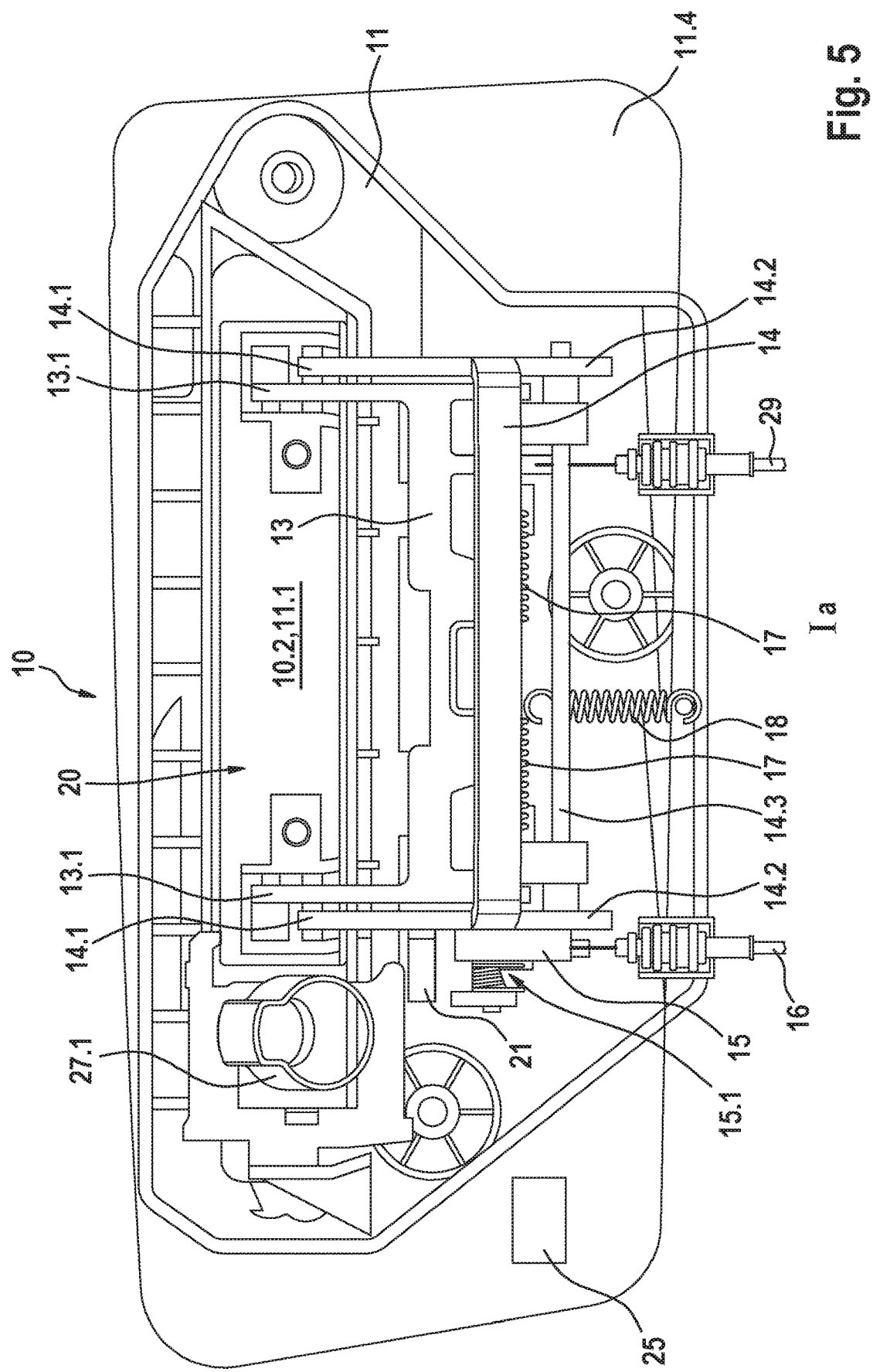
FIG. 5 shows a rear view of a further exemplary embodiment of the handle device according to the invention.

The rear view of a further embodiment of the handle device 10 according to the invention is shown in the further FIG. 5. A panel 11.4 is used for the handle support 11, the handle support 11 itself having grid structures for reinforcement. In addition, a crash barrier 21 is shown in FIG. 5 purely by way of example that can cooperate with the movement mechanism of the handle part 20 in a positive-locking manner to prevent an undesired movement of the handle part 20 in the event of an accident.

A top view from the outside of a movable part 70 in the form of a car door is shown in FIG. 6. Here, a push button 28, or flap 28 or cap 28 is arranged next to the extendable handle part 20 above a mechanical lock cylinder 27, which is shown in dashed lines. By pressing this push button, flap or cap 28, the handle part 20 can also be unlocked in a purely mechanical manner and transferred from the rest position Ia to the operating position Ib by the first swing element 17. In addition, a security system 90, in particular in the form of a central locking mechanism, is shown in FIG. 6. This security system 90 can cooperate with a mobile ID transmitter 91, which is shown in FIG. 7, to achieve electronic authentication and unlock the central locking mechanism.

A complete vehicle 100 having two handle devices 10 according to the invention on two movable parts 70 is shown in FIG. 7. The vehicle electronics 101 and the security system 90 are shown purely by way of example in the engine compartment in dashed lines.

The foregoing explanation of the embodiments describes the present invention only in the context of examples. Of course, individual features of the embodiments, provided they are technically feasible, can be freely combined with each other without departing from the scope of the present invention.

LIST OF REFERENCE CHARACTERS 10 handle device
10.1 front side
10.2 rear side
10.3 installation depth
11 handle support
11.1 interior
11.2 exterior
11.3 holding means
11.4 panel
11.5 seal
12 opening
12.1 edge of 12
12.2 guiding means
13 first lever, in particular drive lever
13.1 pivot point
13.2 pivot point
13.3 axle
13.4 point of application for 29
14 second lever, in particular actuating lever
14.1 pivot point
14.2 pivot point/elongated hole in 14
14.3 axle
14.4 angle
14.5 catch for 15
15 transfer lever
15.1 pivot point
15.2 arcuate guide/arcuate elongated hole
15.3 point of application for 16
16 connection element
17 first spring element for 13
18 second spring element for 15
19 drive for 10, in particular 20
20 handle part
20.1 engagement recess
20.2 handle part depth
21 crash barrier
22 counterweight
23 first sensor element
24 second sensor element
25 control unit
26 lighting unit
26.1 cone of light
27 mechanical lock cylinder
27.1 holder for 27 in 11
28 flap/cap/push button
29 further connection element for 19
50 arrow—linear movement
51 arrow—arcuate movement
52 arrow—vertical movement of 14
70 movable part, in particular door, flap or the like
80 closing device, in particular mechanical lock
90 security system, in particular central locking mechanism
91 mobile ID transmitter
100 vehicle, in particular motor vehicle
101 vehicle electronics
Ia rest position of 20
Ib operating position of 20
Ic trigger position of 20
IIa rest position of 15
IIb trigger position of 15

What is claimed is:

1. A handle device for a closing device for a door or; a flap of a vehicle having a handle part that is supportable in a movable manner relative to a movable part, wherein the closing device is connectable to the handle part via a connection element, and the handle part serves to actuate the closing device,
    wherein the handle part is movable at least between a rest position and an operating position,
    and wherein the handle part in the operating position is able to protrude from the door or the flap such that it can be gripped by an operator,
    wherein the handle part is movable from its operating position to an additional trigger position in which a mechanical actuation of the handle part is transferable to the connection element, allowing the closing device to be actuated,
    wherein the handle part is arranged on a handle support in a movable manner via two levers,
    wherein the two levers comprise a first lever designed as a drive lever to move the handle part at least between the rest position and the operating position,
    wherein the two levers comprise a second lever designed as an actuating lever to transfer the mechanical movement of the handle part from the operating position to the trigger position to the connection element,
    wherein the first lever and the second lever are U-shaped or H-shaped, and wherein one of the first and second levers is designed relative to a handle support to enable a vertical movement of one of the first and second levers relative to the handle support.

2. The handle device according to claim 1, wherein at least the handle part is linearly movable between the rest position and the operating position, or the handle part is arcuately movable between the operating position and the trigger position.

3. The handle device according to claim 1, wherein the handle part is supportable at the door or the flap by the handle support, or wherein at least one of the levers is movably connected to the handle support on both sides via a continuous axle.

4. The handle device according to claim 3, wherein the two levers have pivot points arranged differently from one another for guiding the handle part, or wherein the two levers are arranged side by side and not directly connected to each other, or wherein the two levers embrace the handle part on both sides.

5. The handle device according to claim 3, wherein a drive acts on the first lever, whereby the handle part is movable at least between the rest position and the operating position.

6. The handle device according to claim 3, wherein an actuation of the connection element is possible only after the handle part has reached the operating position.

7. The handle device according to claim 3, wherein the second lever has an angular-shaped design, or wherein at least one pivot point is designed as a pivot bearing relative to the handle support to enable a linear movement of the second lever parallel to the surface of the door or the flap and parallel to the outer surface of the handle support.

8. The handle device according to claim 3, wherein the second lever indirectly cooperates with the connection element mechanically via a transfer lever or wherein a second spring element cooperates with the transfer lever to move the transfer lever to its rest position, or
wherein an arcuate guide between the second lever and the transfer lever is present to form a freewheel between the second lever and the transfer lever, or
wherein the transfer lever has a pivot point relative to the handle support.

9. The handle device according to claim 1, wherein an opening in the handle support for the handle part is covered by an extended handle part both in the operating position and in the trigger position.

10. The handle device according to claim 9, wherein at least an edge of the opening in the handle support for the handle part takes the form of a channel, or the edge has a guiding means to guide the handle part.

11. The handle device according to claim 1, wherein at least one crash barrier or a counterweight is provided to fix the handle part in the rest position in the event of a crash.

12. The handle device according to claim 1, wherein at least a first sensor element is present to control at least the handle device, a security system or vehicle electronics, the sensor element being designed at least as a proximity sensor, engaging sensor, antenna, signal transmitter or temperature sensor.

13. The handle device according to claim 1, wherein at least two sensor elements are present, at least one sensor element being designed as a capacitive sensor, or wherein at least one lighting unit is present that is at least integrated in the handle part or handle support to realize a front field illumination.

14. The handle device according to claim 1, wherein at least a mechanical lock cylinder is provided, whereby the closing device is mechanically unlocked or locked.

15. The handle device according to claim 14, wherein the mechanical lock cylinder is arranged behind the handle part from the outside or behind a flap or cap, or wherein a push button, a flap or a cap serves for an emergency extension of the handle part to its operating position in case of an emergency.

16. The handle device according to claim 1, wherein the handle part has at least one cavity, wherein the handle part has a maximum handle part depth of 45 mm, preferably 40 mm.

17. The handle device according to claim 1, wherein an installation space of the handle device has a maximum installation depth of 65 mm.

18. The handle device according to claim 1, wherein at least one connection element is designed as a flexible connection element.

19. A method for actuating a handle device according to claim 1,
wherein the handle part in operating position is able to protrude from the movable part such that it can be gripped by an operator,
wherein, the handle part is movable from its operating position to an additional trigger position in which a mechanical actuation of the handle part is transferable to the connection element, allowing the closing device to be actuated.

20. A method for actuating a handle device according to claim 19,
wherein at least one of the following is executed:
d1) detection by a sensor element of an approach of the operator,
d2) detection by a sensor element of an attempt by the operator to reach into the handle part,
e) control of at least security system or vehicle electronics,
f) switch on of a mobile ID transmitter of a security system, and
g) front field illumination by a lighting unit.

21. The handle device according to claim 1, wherein the handle part in the rest position is configurable to be flush with the outer contour of the door or the flap.

22. The handle device according to claim 11, wherein, at least the crash barrier or the counterweight mechanically cooperate with at least one of the two levers.

23. The handle device according to claim 14, wherein the mechanical lock cylinder is provided on the handle support.

* * * * *

UNITED STATES PATENT AND TRADEMARK OFFICE
CERTIFICATE OF CORRECTION

PATENT NO. : 10,563,437 B2
APPLICATION NO. : 15/512574
DATED : February 18, 2020
INVENTOR(S) : Markus Bartels et al.

Page 1 of 1

It is certified that error appears in the above-identified patent and that said Letters Patent is hereby corrected as shown below:

On the Title Page

Column 1, Item (22) PCT Filed, "Aug. 14, 2015" should be changed to -- Sep. 15, 2015 --

Column 1, Item (30) Foreign Application Priority Data, Line 2, "20 2014 010 524 U" should be changed to -- 20 2014 010 524.3 --

Signed and Sealed this
Fourteenth Day of July, 2020

Andrei Iancu
*Director of the United States Patent and Trademark Office*